(12) United States Patent
Wei et al.

(10) Patent No.: US 11,857,024 B2
(45) Date of Patent: Jan. 2, 2024

(54) COMPOSITE FOAM FOR MIDSOLE (71) Applicant: Columbia Sportswear North America, Inc., Portland, OR (US)

(72) Inventors: Yi Jiang Wei, Portland, OR (US); Haskell Beckham, Portland, OR (US); Gary John Banik, Portland, OR (US)

(73) Assignee: COLUMBIA SPORTSWEAR NORTH AMERICA, INC., Portland, OR (US)

( * ) Notice: Subject to any disclaimer, the term of this patent is extended or adjusted under 35 U.S.C. 154(b) by 468 days.

(21) Appl. No.: 17/045,599

(22) PCT Filed: Apr. 16, 2019

(86) PCT No.: PCT/US2019/027752
§ 371 (c)(1),
(2) Date: Oct. 6, 2020

(87) PCT Pub. No.: WO2019/204358
PCT Pub. Date: Oct. 24, 2019

(65) Prior Publication Data
US 2021/0093038 A1 Apr. 1, 2021

Related U.S. Application Data

(60) Provisional application No. 62/658,161, filed on Apr. 16, 2018.

(51) Int. Cl.
*C08J 9/00* (2006.01)
*A43B 13/02* (2022.01)
*C08L 75/04* (2006.01)
*A43B 13/04* (2006.01)

(52) U.S. Cl.
CPC ............ *A43B 13/026* (2013.01); *A43B 13/04* (2013.01); *C08J 9/0061* (2013.01); *C08L 75/04* (2013.01); *C08J 2367/02* (2013.01); *C08J 2375/04* (2013.01); *C08J 2377/00* (2013.01); *C08J 2467/02* (2013.01); *C08J 2475/04* (2013.01); *C08J 2477/00* (2013.01)

(58) Field of Classification Search
CPC ....... A43B 13/026; A43B 13/04; A43B 13/12; C08J 9/0061; C08J 2367/02; C08J 2375/04; C08J 2377/00; C08J 2467/02; C08J 2475/04; C08J 2477/00; C08J 9/35; C08J 2400/22; C08J 2400/26; C08L 75/04

See application file for complete search history.

(56) References Cited

U.S. PATENT DOCUMENTS

| 9,682,552 | B2 | 6/2017 | Kato et al. |
| 2010/0047550 | A1 | 2/2010 | Prissok et al. |
| 2015/0038607 | A1 | 2/2015 | Baghdadi |
| 2018/0093437 | A1* | 4/2018 | Wardlaw .............. B29D 35/148 |

FOREIGN PATENT DOCUMENTS

| EP | 3109281 | | 12/2016 |
| GB | 1337413 | * | 11/1973 |
| WO | 2016-030333 | | 3/2016 |

OTHER PUBLICATIONS

International Search Report and Written Opinion from PCT/US2019/027752 dated Aug. 5, 2019, 12 pages.

* cited by examiner

*Primary Examiner* — Irina S Zemel (74) *Attorney, Agent, or Firm* — Schwabe, Williamson & Wyatt, P.C.

(57) ABSTRACT

Embodiments herein relate generally to the field of footwear, and more particularly to components of performance footwear, such as midsoles, and in particular related to a high performance composite foam for a midsole, the composite foam comprising: a pelletized expanded thermoplastic elastomer; and a polyurethane (PU) matrix, wherein the pelletized expanded thermoplastic elastomer is mixed within the PU matrix. Midsoles made from a high performance composite foam and footwear including such midsoles. A method of making a high performance midsole is also provided.

22 Claims, 6 Drawing Sheets

FIG. 6B ern embodiments may be utilized and structural or logical changes may be made without departing from the scope. Therefore, the following detailed description is not to be taken in a limiting sense, and the scope of embodiments is defined by the appended claims and their equivalents.

COMPOSITE FOAM FOR MIDSOLE

CROSS-REFERENCE TO RELATED APPLICATION

This application claims the right of priority to and benefit of earlier filing date of U.S. Provisional Application No. 62/658,161, filed on Apr. 16, 2018, which is hereby incorporated herein by reference it its entirety.

TECHNICAL FIELD

Embodiments herein relate generally to the field of footwear, and more particularly to foam for components of performance footwear, such as midsoles.

BACKGROUND

Performance athletic footwear typically includes two primary components, an upper and a sole. The upper provides a covering for the foot and positions the foot with respect to the sole. The sole is coupled to the upper and is generally configured to contact the ground during impact. In modern shoe design the sole provides cushioning during impact, traction, and motion control.

The structure of the sole portion of a performance athletic shoe typically has a layered configuration that may include an insole, a resilient midsole formed from a polymer foam material, and a ground-contacting outsole that provides both abrasion-resistance and traction. The midsole is the primary structural element that provides cushioning and motion control. In many if not most performance athletic shoes, the midsole is made from a polymer foam. Polymer foams are particularly suited for use in midsole construction because their compression and resiliency attenuate reaction forces created by impact with the ground. Conventional polymer foam materials are resiliently compressible, in part, due to the inclusion of a plurality of open or closed cells that define an inner volume substantially displaced by gas.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Disclosed here is a composite foam for use in a midsole of performance footwear. While certain embodiments are discussed with reference to performance footwear such as shoes, embodiments herein may be applicable to a wide variety of activities, such as running and hiking; various sports, such as volleyball, basketball, and tennis; various professions, such as medical, industrial, safety, rescue, and military, and other suitable applications.

Foams used for midsole applications are expected to be lightweight, cushion, but rebound. Over time, the repeated compression-and-release that a midsole foam undergoes leads to 'set', meaning that it does not rebound as much as it did when it was new. It gets "set", typically to some increasing extent, in its compressed state. This is known in the industry as 'pack out'. It is desirable to have a midsole foam with high values of rebound, also known as resilience, and low values of compression set, while being lightweight.

The composite foam compositions disclosed herein include one or more expanded thermoplastic elastomers, such as an expanded thermoplastic polyester elastomer (eTPEE), an expanded thermoplastic poly(ether-amide) (eTPEA) (e.g., a block copolymer with polyether and polyamide backbone blocks), an expanded thermoplastic polyolefin (eTPO), or an expanded blend of polymers in a pelletized form that is embedded within a polyurethane (PU) matrix (see, e.g. FIGS. 1-4). In embodiments, an expanded thermoplastic elastomer includes one or more different thermoplastic elastomers, such as described above.

Figure 6A:
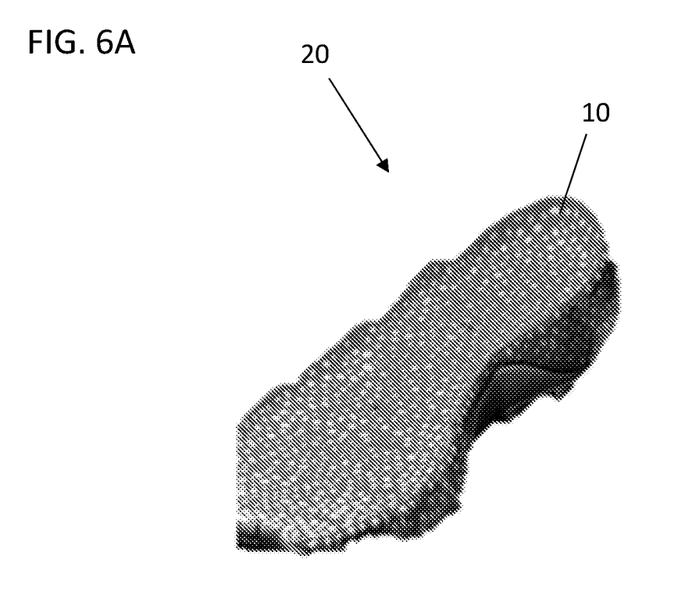
FIGS. 6A and 6B are digital images showing a midsole composed of a composite foam, in accordance with various embodiments.
Figure 6B:
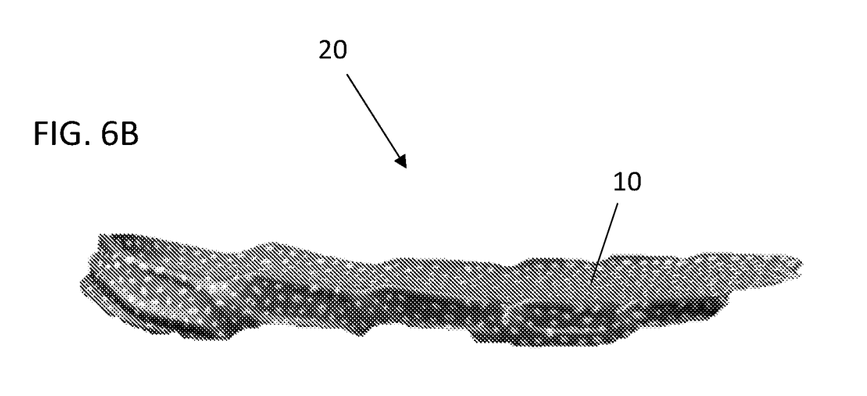

Although the pellets are within the matrix, some of the pellet surfaces may be visible on the exterior surface of a midsole made from such foams, see for example FIGS. 6A and 6B. One of the features that makes composite foams so useful, is that the properties of both the expanded thermoplastic elastomer and PU can be tuned independently to create a composite that exhibits a combination of properties that cannot be otherwise achieved, especially by blending the two materials which generally leads to averaging of the physical properties, and a resultant compromised product.

Figure 5A:
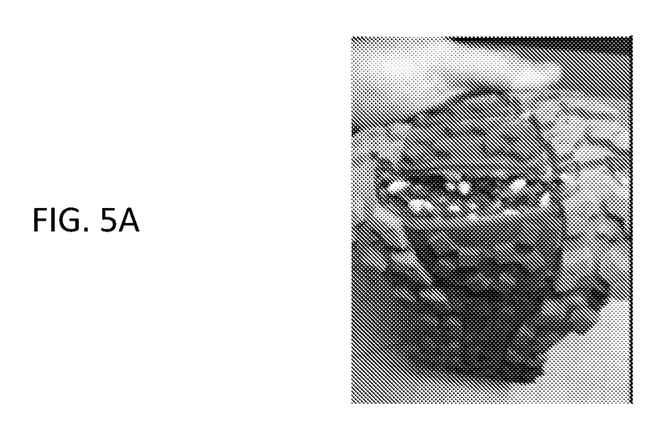
FIGS. 5A-5C are digital images showing the delamination/degranulation of test foams not encompassed by this disclosure.
Figure 5B:
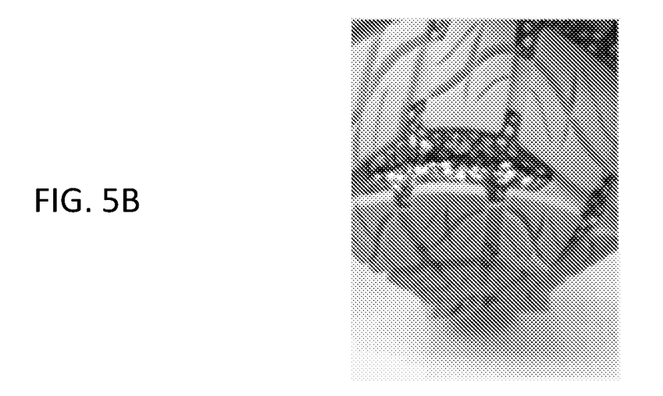
Figure 5C:
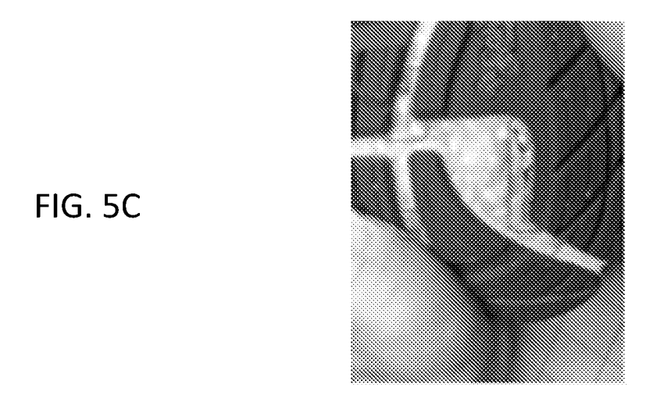

However, a major challenge in creating composites for applications in which the composite will be flexed or otherwise stressed is insufficient bonding at the interface between the two components, in this case the expanded thermoplastic elastomer and NU interface. Because the two primary components of the disclosed composite foam are two different polymers there is an expectation that the interface would not be of sufficient strength to resist delamination and/or degranulation resulting in mechanical failure at the interface, e.g. splitting. This expectation was based in part on the finding that early composite foams composed of an expanded thermoplastic polyurethane (eTPU) and a polyurethane (PU) failed at the intermaterial interface (see e.g., FIGS. 5A-5C). Thus, even though the components in the early composite foams were both polyurethanes, the bonding at the interface was not good enough to withstand flexing during wear tests. One of ordinary skill in the art would not expect bonding to be improved by changing one of the components to a different material type. More likely the expectation would be that adhesives or surface modification protocols, with the added cost and manufacturing step involved, would need to be considered. The expectation would have been that a composite of two linked materials (the expanded thermoplastic polyurethane pellets and the polyurethane matrix) would have had a significantly higher bond strength at the interface than a pelletized expanded thermoplastic polyester or block copolymer elastomer and polyurethane matrix. Surprisingly however, when evaluating alternative composite foam compositions, a composite of eTPEE and PU was found to have a significantly higher interface bond strength than eTPU/PU composite (20 N/cm for the eTPEE/PU composite vs. 9 N/cm for the eTPU/PU composite). While eTPU/PU hybrid composites can be manufactured with better interfacial bond strength, they have not been observed to exhibit the overall combination of physical properties that the eTPEE/PU and eTPEE/PU hybrid composites exhibit.

Furthermore, this increase in interface bond strength was not made at the expense of other desirable characteristics. As shown in Table 1 below, the eTPEE/PU maintained desirable characteristics for a performance foam, such as hardness, resilience and compression set while having an increased wear resistance over the eTPU/PU composite, as shown by the split tear results.

TABLE 1

|  | eTPU | PIT | eTPU/PU | eTPEE/PU | eTPEA/PU |
|---|---|---|---|---|---|
| Hardness[a] (Asker Scale) | 40C | 35C | 45C | 42C | 45C |
| Density[b] (g/cm$^3$) | 0.22 | 0.31 | 0.30 | 0.30 | 0.19 |
| Split Tear[c] (N/cm) | >27 | 12.5 | 9 | 20 | 26 |
| Resilience[d] | 55% | 42% | 53% | 55% | 64% |
| Compression Set[e] | 45-50% | 15% | 51% | 32% | 33% |

[a]ASTM D-2240, Satra TM205-99
[b]Satra TM134-98
[c]Satra TM65
[d]ASTM D2632
[e]ASTM D395

With reference to Table 1, the eTPEE/PU and eTPEA/PU heterogeneous composites exhibit the best combination of high resiliency with low compression set. The high resiliency measured demonstrates a high rebound and high energy return, which are desired features for high performance footwear. The low value for compression also demonstrates the high durability of the composite foam. As previously described, the split tear strength is, for the heterogeneous composite materials, an indication of the interfacial bond strength, and how well the material can withstand flexing. The same wear trials that resulted in the poor interfacial bonding exemplified by FIGS. 5A-5C have been successfully tried on footwear made from eTPEE/PU composite midsoles, resulting in no delamination or degranulation failure. Similar results were observed for the interface of the ePEA and PU. The eTPEE/PU hybrid exhibits higher energy return than the PU, eTPU, and eTPU/PU hybrid materials. The dynamic compression set for the eTPEE/PU hybrid is also lower than the dynamic compression set for the eTPU and eTPU/PU hybrid materials. Lower density hybrid composites can be made using Pebax® (Arkema), a poly(ether amide), without significantly compromising the energy return. While the PU exhibits lower dynamic compression set (3%), it also exhibits lower energy return. By combining the PU and eTPEE to make a hybrid composite, a cushioning material can be made with high energy return and low compression set.

The disclosed composite foam composition includes an expanded thermoplastic elastomer in a pelletized form embedded within a polyurethane (PU) matrix, such as eTPEE, eTPEA, eTPO, or an expanded blend of polymers. In embodiments, the expanded thermoplastic elastomer pellets are generally spheroid in shape with major and minor axes ranging between about 1 mm to about 12 mm, such as about 2 mm to about 8 mm. In embodiments, the expanded thermoplastic elastomer pellets have a density of between about 0.06 g/cm$^3$ and about 0.20 g/cm$^3$, such as about 0.11 g/cm$^3$ or 0.13 g/cm$^3$. This low density combined with other properties, such as a resilience of greater than about 50% or 60%, provides a foam material useful as a midsole for performance footwear.

In an example, the disclosed composite foam composition includes an expanded thermoplastic polyester elastomer (eTPEE) in a pelletized form embedded within a polyurethane (PU) matrix. In embodiments, the eTPEE pellets are generally spheroid in shape with major and minor axes ranging between about 1 mm to about 12 mm, such as about 2 mm to about 8 mm. In embodiments, the eTPEE pellets have a density of between about 0.08 g/cm$^3$ and about 0.20 g/cm$^3$, such as about 0.13 g/cm$^3$. This low density combined with other properties, such as a resilience of greater than about 50%, provides a foam material useful as a midsole for performance footwear.

In an example, disclosed composite foam composition includes an expanded thermoplastic poly(ether amide) (eT- PEA) in a pelletized form embedded within a polyurethane (PU) matrix. In embodiments, the eTPEA pellets are generally spheroid in shape with major and minor axes ranging between about 1 mm to about 12 mm, such as about 2 mm to about 8 mm. In embodiments, the eTPEA pellets have a density of between about 0.08 g/cm$^3$ and about 0.20 g/cm$^3$, such as about 0.11 g/cm$^3$. This low density combined with other properties, such as a resilience of greater than about 60%, provides a foam material useful as a midsole for performance footwear.

In another example, disclosed composite foam composition includes an expanded thermoplastic polyolefin (eTPO) in a pelletized form embedded within a polyurethane (PU) matrix. In embodiments, the eTPO pellets are generally spheroid in shape with major and minor axes ranging between about 1 mm to about 12 mm, such as about 2 mm to about 8 mm. In embodiments, the eTPO pellets have a density of between about 0.08 g/cm$^3$ and about 0.20 g/cm$^3$. This low density combined with other properties, such as a resilience of greater than about 60%, provides a foam material useful as a midsole for performance footwear.

In an example, disclosed composite foam composition includes a blend of polymers, e.g., an expanded blend of polymers in a pelletized form embedded within a polyurethane (PU) matrix. In embodiments, the pellets are generally spheroid in shape with major and minor axes ranging between about 1 mm to about 12 mm, such as about 2 mm to about 8 mm. In embodiments, the pellets have a density of between about 0.08 g/cm$^3$ and about 0.20 g/cm$^3$. This low density combined with other properties, such as a resilience of greater than about 60%, provides a foam material useful as a midsole for performance footwear.

In an embodiment, the composite foam is prepared by mixing the expanded thermoplastic elastomer pellets with a polyisocyanate and a polyol prepolymer containing chain extender, water, pigment, stabilizers, and other additives, to form a slurry. The mixing ratio of polyisocyanate to polyol prepolymer is in the range of 0.5 to 1.5, depending on specific chemical structure of each component and the processing conditions. In another embodiment, the composite foam is prepared by mixing the expanded thermoplastic elastomer pellets with a single-component polyurethane prepolymer containing blowing agent, pigment, stabilizers, and other additives, to form a slurry. The weight percentage of expanded thermoplastic elastomer pellets to PU is 40% to 70%. The mixing occurs at 40 to 50° C., and the slurry is then poured into a mold for PU expansion and curing. The top plate of the mold is closed, and then the expansion and curing occurs over the course of 5 to 20 minutes, about half of which time the mold is 60 to 80° C. In some manufacturing process set-ups, the expansion and curing time may be shortened by using molds that allow more efficient heat maintenance and transfer In embodiments, a formed midsole made from a disclosed composite foam has a density of about 0.10 g/cm$^3$ to about 0.40 g/cm$^3$, such as about 0.2 g/cm$^3$ or 0.3 g/cm$^3$. In embodiments, a formed midsole made from a disclosed composite foam has an Asker hardness of at least 35 C, for example greater than about 40 C, such as between about 40 C and about 55 C, e.g. about 42 C. In embodiments, a formed midsole made from a disclosed composite foam has a split tear value of at least 15 N/cm, for example at least 16, 17, 18, 19, 20, 25, 30 and 35 N/cm, such as between about 18 and about 28 N/cm, e.g., about 20 N/cm or 26 N/cm. In embodiments, a formed midsole made from a disclosed composite foam has a resilience of at least about 40%, such as at least 45%, at least 46%, at least 47%, at least 48%, at least 49%, or at least 50%, for example between about 50% and 70%, such as about 55%, 64%, or 68%. In embodiments, a formed midsole made from a disclosed composite foam has a dynamic compression set below about 12%, such as below about 11%, 10%, 9%, 8%, or even 7%.

Figure 1:
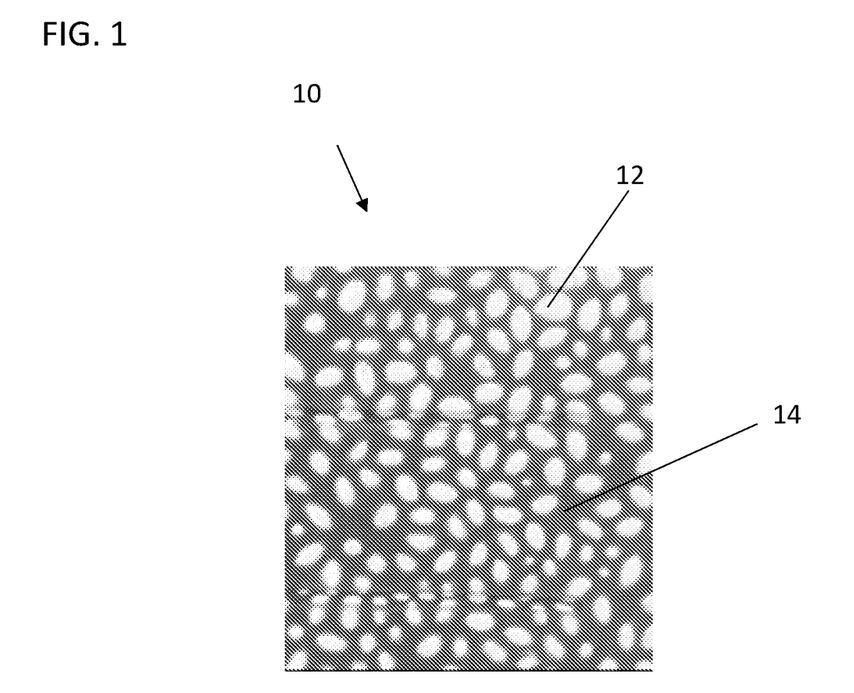
FIG. 1 is a digital image of an exemplary composite foam for a midsole, in accordance with various embodiments.
Figure 2:
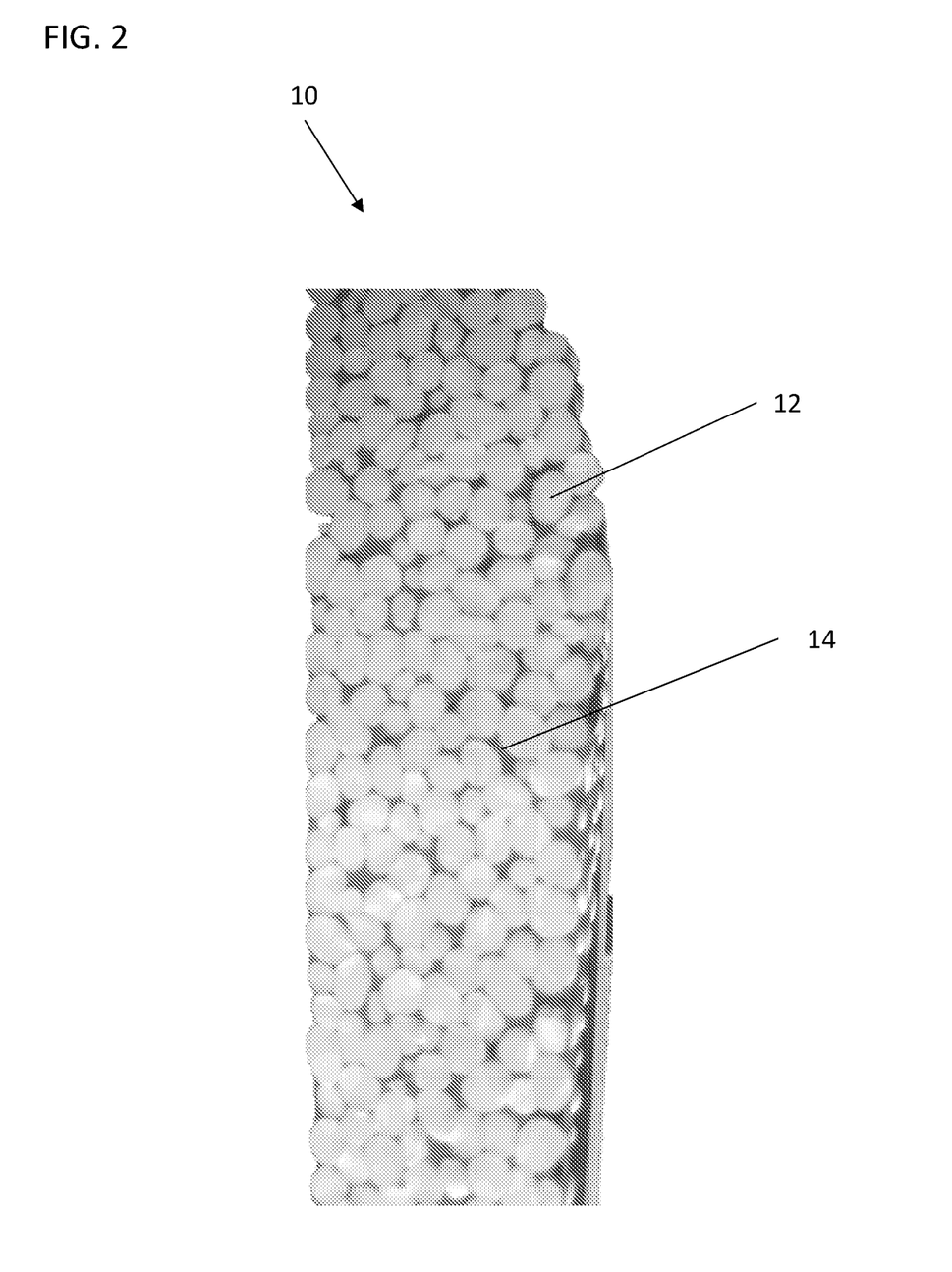
FIG. 2 is a digital image of a toe to heel cross-sectional slice of an exemplary composite foam for a midsole, in accordance with various embodiments.
Figure 3:
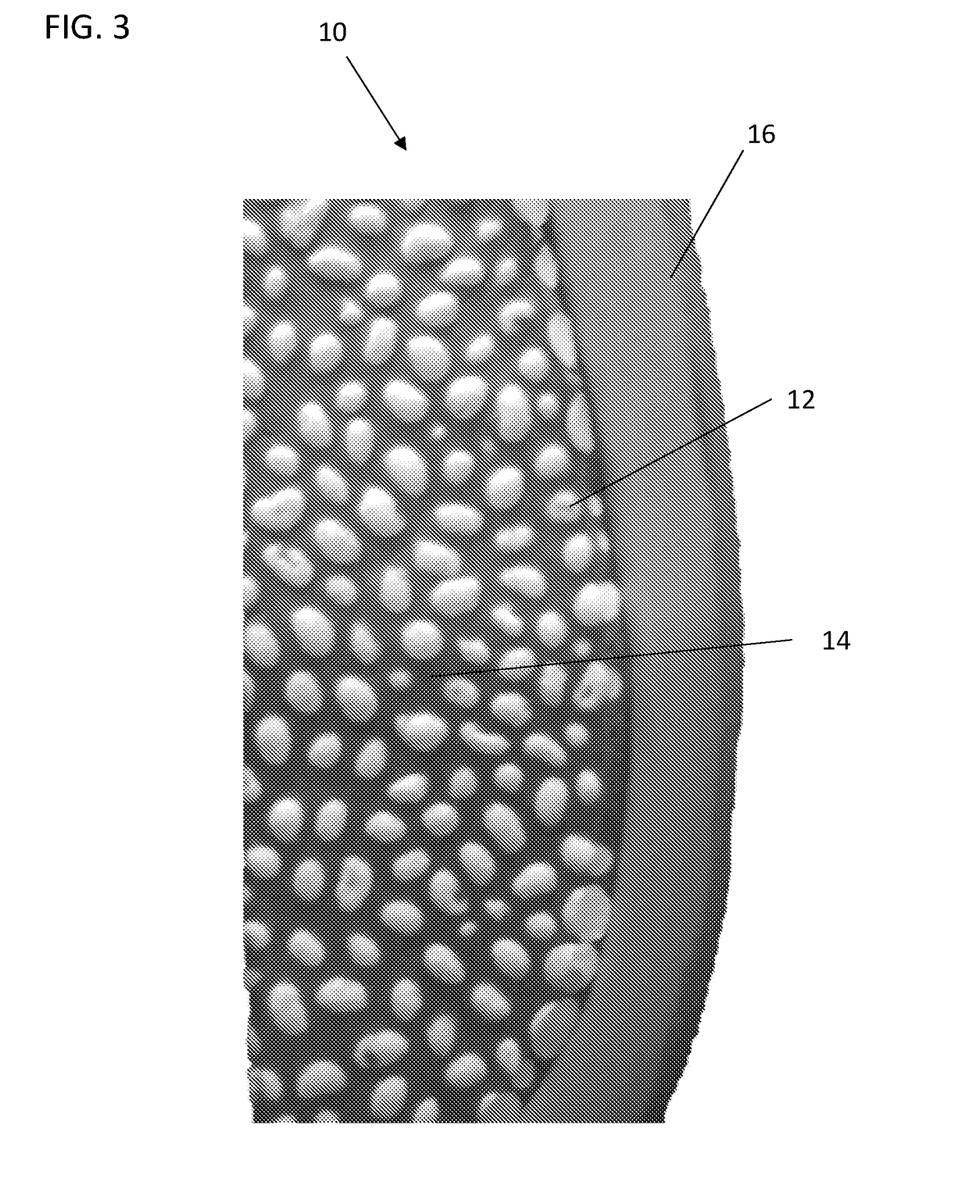
FIG. 3 is a digital image of the exemplary composite foam of FIG. 2 looking down (from the insole orientation), in accordance with various embodiments.
Figure 4:
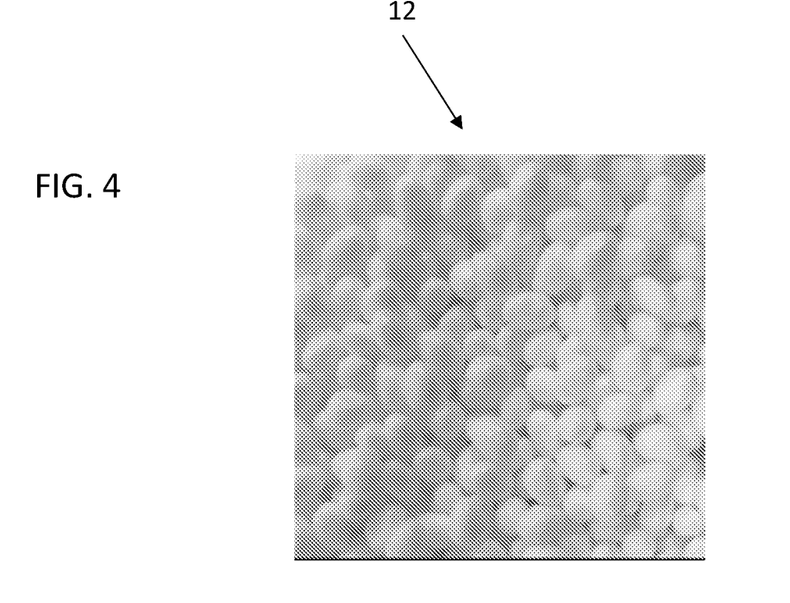
FIG. 4 is a digital image of pelletized foam material used in a composite foam, in accordance with various embodiments.

FIGS. 1-3 are digital images of composite foams, in accordance with various embodiments. FIG. 1 is a digital image of an exemplary composite foam 10 for a midsole, in accordance with various embodiments. FIG. 2 is a digital image of a toe to heel cross-sectional slice of an exemplary composite foam 10 for a midsole, in accordance with various embodiments. FIG. 3 is a digital image of the exemplary composite foam 10 of FIG. 2 looking down (from the insole orientation), in accordance with various embodiments. With reference to FIGS. 1-3, the composite foam 10 is composed of expanded thermoplastic elastomer pellets 12 (eTPEE pellets in this example) homogenously mixed (mixed throughout in a substantially uniform distribution) within a PU matrix 14. FIG. 4 is a close up of the expanded thermoplastic elastomer pellets 12 prior to mixing with the PU. FIGS. 6A and 6B are digital images showing a midsole 20 composed of a composite foam 10, in accordance with various embodiments.

Example 1

Slabs of eTPU/PU and eTPEE/PU hybrid composites were prepared at the same 60/40 weight percentages of expanded pellets to PU resin. Slabs of eTPEA/PU hybrid composites were prepared at a 50/50 weight percentage. Data were collected and are shown in the table below.

|  | Density (g/cm$^3$) | Energy Return[a] | Dynamic Compression Set[b] |
|---|---|---|---|
| PU | 0.30 | 57% | 3% |
| eTPU | 0.24 | 57% | 10% |
| eTPU/PU | 0.19 | 56% | 12% |
| eTPEE/PU | 0.29 | 65% | 7% |
| eTPEA/PU | 0.20 | 62% | 7% |

[a]ASTM F1976
[b]Measured after 100,000 degradation cycles, simulating a 100-mile run based on an average stride length of a male runner.

Data are averages of two measurements. Dynamic compression set measured after 100,000 degradation cycles (5 J), simulating a 100-mile run based on an average stride length of a male runner, using a custom-built degradation machine. Samples were slabs molded to be between 18 and 26 mm thick. After 100,000 cycles, slabs were allowed to recover for 1 hour and then the thickness measured. The difference between this measured thickness and the original thickness were used to compute the dynamic compression set. Energy return was measured in an impact device.

The eTPEE/PU and eTPEA/PU hybrid composites exhibit higher energy return than the PU, eTPU, and eTPU/PU hybrid materials. The dynamic compression set for the eTPEE/PU and eTPEA/PU hybrids is also lower than the dynamic compression set for the eTPU and eTPU/PU hybrid materials. Lower density hybrid composites can be made using expanded poly(ether amide) pellets, without significantly compromising the energy return. While the PU exhibits lower dynamic compression set (3%), it also exhibits lower energy return. By combining the PU and expanded thermoplastic elastomer to make a hybrid composite, a cushioning material can be made with high energy return and low compression set.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A high performance composite foam for a midsole comprising:
   a pelletized expanded thermoplastic elastomer comprising an expanded thermoplastic polyester elastomer; and
   a polyurethane (PU) matrix, wherein the pelletized expanded thermoplastic elastomer is mixed within the PU matrix.

2. The high performance composite foam of claim 1, wherein the pelletized expanded thermoplastic elastomer comprises an expanded thermoplastic poly(ether amide) elastomer.

3. The high performance composite foam of claim 1, wherein the pelletized expanded thermoplastic elastomer comprises an expanded thermoplastic polyolefin.

4. The high performance composite foam of claim 1, wherein the pelletized expanded thermoplastic elastomer comprises an expanded blend of thermoplastic polymers.

5. The high performance composite foam of claim 1, wherein the pelletized expanded thermoplastic elastomer is spheroid in shape with major and minor axes ranging between about 1 mm to about 12 mm.

6. The high performance composite foam of claim 1, wherein the pelletized expanded thermoplastic elastomer pellets have a density of between about 0.06 g/cm$^3$ and about 0.20 g/cm$^3$.

7. The high performance composite foam of claim 1, wherein the PU matrix is prepared from one or more polyisocyanates and one or more polyols.

8. The high performance composite foam of claim 1, wherein the composite foam has a density of about 0.18 g/cm$^3$ to about 0.40 g/cm$^3$.

9. The high performance composite foam of claim 1, wherein the composite foam has an Asker hardness at least 35 C.

10. The high performance composite foam of claim 1, wherein the composite foam has a split tear value of at least 15 N/cm.

11. The high performance composite foam of claim 1, wherein the composite foam has a resilience of at least about 40%.

12. The high performance composite foam of claim 1, wherein the composite foam has dynamic compression set below about 12%.

13. The high performance composite foam of claim 1, wherein the expanded thermoplastic elastomer is mixed homogenously within the PU matrix.

14. A midsole for footwear comprising the high performance composite foam of claim 1.

15. An article of footwear comprising the midsole of claim 14.

16. A method of making a high performance midsole comprising:
    mixing a pelletized expanded thermoplastic elastomer and a polyurethane (PU) matrix, the pelletized expanded thermoplastic elastomer comprising an expanded thermoplastic polyester elastomer; and molding the expanded thermoplastic elastomer PU mixture to form the midsole.

17. The method of claim 16, wherein the pelletized expanded thermoplastic elastomer comprises an expanded thermoplastic poly(ether amide) elastomer.

18. The method of claim 16, wherein the pelletized expanded thermoplastic elastomer comprises an expanded thermoplastic polyolefin.

19. The method of claim 16, wherein the pelletized expanded thermoplastic elastomer comprises an expanded blend of thermoplastic polymers.

20. The method of claim 16, wherein the pelletized expanded thermoplastic elastomer is spheroid in shape with major and minor axes ranging between about 1 mm to about 12 mm.

21. The method of claim 16, further comprising preparing the PU matrix from one or more polyisocyanates and one or more polyols.

22. The method of claim 16, further comprising forming the pelletized expanded thermoplastic elastomer.

* * * * *